US010477282B2

(12) United States Patent
Li et al.

(10) Patent No.: US 10,477,282 B2
(45) Date of Patent: Nov. 12, 2019

(54) METHOD AND SYSTEM FOR MONITORING VIDEO WITH SINGLE PATH OF VIDEO AND MULTIPLE PATHS OF AUDIO

(71) Applicant: Hang Zhou Hikvision Digital Technology Co., Ltd., Hangzhou (CN)

(72) Inventors: Kui Li, Hangzhou (CN); Ruiqing Cai, Hangzhou (CN); Jie Chen, Hangzhou (CN); Zailong Ling, Hangzhou (CN); Xiangqing Jin, Hangzhou (CN)

(73) Assignee: Hang Zhou Hikvision Digital Technology Co., Ltd., Hangzhou (CN)

( * ) Notice: Subject to any disclaimer, the term of this patent is extended or adjusted under 35 U.S.C. 154(b) by 816 days.

(21) Appl. No.: 15/121,743

(22) PCT Filed: May 30, 2013

(86) PCT No.: PCT/CN2013/076501
§ 371 (c)(1),
(2) Date: Dec. 14, 2016

(87) PCT Pub. No.: WO2014/153831
PCT Pub. Date: Oct. 2, 2014

(65) Prior Publication Data
US 2017/0099524 A1 Apr. 6, 2017

(30) Foreign Application Priority Data

Mar. 29, 2013 (CN) .......................... 2013 1 0109433

(51) Int. Cl.
*H04L 29/06* (2006.01)
*H04N 21/63* (2011.01)
(Continued)

(52) U.S. Cl.
CPC ........... *H04N 21/631* (2013.01); *H04L 65/00* (2013.01); *H04L 65/608* (2013.01);
(Continued)

(58) Field of Classification Search
CPC ..... H04L 65/608; H04L 65/00; H04L 65/607; H04N 21/631; H04N 21/6437
See application file for complete search history.

(56) References Cited

U.S. PATENT DOCUMENTS 6,466,550 B1 * 10/2002 Foster ................. H04L 12/1813
370/261
2003/0165136 A1 * 9/2003 Cornelius ......... H04L 29/06027
370/356

(Continued)

FOREIGN PATENT DOCUMENTS

| CN | 1561078 A | 1/2005 |
| CN | 101689998 A | 3/2010 |
| WO | 01/03389 A1 | 1/2001 |

OTHER PUBLICATIONS

European Patent Office; Supplemental European Search Report and Opinion; EP 13880464; Dated Oct. 19, 2017.
(Continued)

*Primary Examiner* — Jeong S Park
(74) *Attorney, Agent, or Firm* — Jones Day

(57) ABSTRACT

The present invention provides a method and system for video surveillance with a single channel of video and multiple channels of audio. The method comprises: a device end allocating a fixed initial SSRC value for each channel of audio; a client end and the device end establishing an RTSP interaction mode; the client end requesting, from the device end, a single channel of video and multiple channels of audio, the device end randomly generating, for each channel of audio, a corresponding modified SSRC value, and sending the same to the client end; the device end capturing the single channel of video and the multiple channels of audio and sending an RTP packet of the single channel of video to the client end, and after modifying the initial SSRC value in the RTP packet of each channel of audio to the correspond- (Continued)

ing modified SSRC value, sending the RTP packet of each channel of audio including the modified SSRC value to the client end; the client end distinguishing individual channels of audio according to the modified SSRC values in the RTP packets of the multiple channels of audio, and playing the video and/or the audio of a corresponding channel according to a user's demand. The present invention can implement audio-video capturing of multiple channels of audio and a single channel of video, and enable a user to select freely and play video and/or audio of a corresponding channel.

9 Claims, 3 Drawing Sheets

(51) Int. Cl.
H04N 21/6437 (2011.01)
H04N 21/442 (2011.01)
H04N 21/439 (2011.01)
H04N 21/44 (2011.01)

(52) U.S. Cl.
CPC .......... *H04N 21/439* (2013.01); *H04N 21/44* (2013.01); *H04N 21/44209* (2013.01); *H04N 21/6437* (2013.01); *H04L 65/607* (2013.01)

(56) References Cited

U.S. PATENT DOCUMENTS

| | | | |
|---|---|---|---|
| 2006/0087987 A1* | 4/2006 | Witt | H03M 7/30 370/260 |
| 2006/0227237 A1* | 10/2006 | Kienzle | G08B 13/194 348/343 |
| 2008/0107108 A1* | 5/2008 | Bouazizi | H04N 7/17318 370/389 |
| 2009/0163254 A1* | 6/2009 | Chandra | H04L 65/604 455/574 |
| 2009/0172763 A1 | 7/2009 | Liu | |
| 2012/0144056 A1* | 6/2012 | Stokking | H04L 65/80 709/231 |
| 2013/0169741 A1* | 7/2013 | Witt | H03M 7/30 348/14.07 |

OTHER PUBLICATIONS

Schulzrinne, H., Casner, S., Frederick, R., Jacobson, V.; RTP: A Transport Protocol for Real-Time Applications; Network Working Group; Jul. 2003.

Chinese Patent Office; Office Action dated Oct. 28, 2016; Application No. 201310109433.6; Machine Translation attached.

* cited by examiner

METHOD AND SYSTEM FOR MONITORING VIDEO WITH SINGLE PATH OF VIDEO AND MULTIPLE PATHS OF AUDIO

This application is a U.S. National Stage Application under 35 U.S.C. § 371 of International Patent Application No. PCT/CN2013/076501, filed May 30, 2013, which claims the benefit of priority of Chinese Patent Application No. 201310109433.6, filed Mar. 29, 2013. The entire contents of International Patent Application No. PCT/CN2013/076501 is incorporated herein by reference.

TECHNICAL FIELD

The present invention relates to a method and system for video surveillance with a single channel of video and multiple channels of audio.

BACKGROUND ART

Nowadays, during video monitoring, analog video capturing points of a single channel normally only correspond to one channel of audio. And audio and video signals are synthesized into a combined data stream by embedded devices via a series of operations, such as capturing, encoding and packaging, for audio and video applications, such as local storage and remote request.

However, with the improvement of video monitoring requirements, currently there exists a monitoring scene in which a monitoring area provided with an IP camera is divided into a plurality of different functional zones (e.g., several counters), in such a monitoring scene, the managing center for video monitoring is not only required to remotely capture and play a real-time video, but is also required to randomly play a channel of audio. For this monitoring scene, the existing monitoring methods in which analog video capturing points of a single channel correspond to one channel of audio are obviously incapable of satisfying the application requirements of single channel of video coordinating with multiple channels of audio.

CONTENT OF THE INVENTION

An objective of the present invention is to provide a method and system for video surveillance with a single channel of video and multiple channels of audio, which enables the audio-video capture with multiple channels of audio and single channel of video, and enables a user to select freely a video and/or an audio of a corresponding channel to play.

To resolve the above problems, the present invention provides a method for video surveillance with single channel of video and multiple channels of audio, which comprises:

allocating a fixed initial SSRC value for each channel of audio by a device end;

establishing an RTSP interaction mode between a client end and the device end;

the client end requesting, from the device end, single channel of video and multiple channels of audio, the device end randomly generating, for each channel of audio, a corresponding modified SSRC value to be written into an RTP packet and sending the corresponding modified SSRC value of each channel of audio to the client end;

the device end capturing the single channel of video and the multiple channels of audio, generating an RTP packet of the single channel of video and sending the same to the client end, generating an RTP packet of each channel of audio containing the initial SSRC value, and modifying the initial SSRC value in the RTP packet of each channel of audio to the corresponding modified SSRC value, then sending the RTP packet of each channel of audio containing the modified SSRC value to the client end, wherein each RTP packet contains a PT value distinguishing video from audio;

the client end receiving RTP packets of the single channel of video and of the multiple channels of audio, distinguishing the video from the audio according to the PT values in the RTP packets, distinguishing individual channels of audio according to the modified SSRC values in the RTP packets of the multiple channels of audio, and playing the video and/or the audio of a corresponding channel according to user's demands.

Further, in the above method, the step of generating an RTP packet of the single channel of video and sending the same to the client end, generating an RTP packet of each channel of audio containing the initial SSRC value, and modifying the initial SSRC value in the RTP packet of each channel of audio to the corresponding modified SSRC value, then sending the RTP packet of each channel of audio containing the modified SSRC value to the client end, comprises:

encoding and compressing each channel of audio or video respectively and individually so as to form a data stream, packaging the data stream to form an RTP packet containing the initial SSRC value; sending the RTP packet of the single channel of video to the client end;

modifying the initial SSRC value in the RTP packet of each channel of audio to the corresponding modified SSRC value, then sending the RTP packet of each channel of audio containing the modified SSRC value to the client end.

Further, in the above method, the step of the client end distinguishing the video from the audio according to the PT values in the RTP packets, distinguishing individual channels of audio according to the modified SSRC values in the RTP packets of the multiple channels of audio, and playing the video and/or the audio of a corresponding channel according to user's demands comprises:

unpacking the RTP packets, distinguishing the video from the audio according to the PT values in the RTP packets, and distinguishing individual channels of audio according to the modified SSRC values in the RTP packets of multiple channels of audio, decompressing the data stream of each channel of audio or video, and playing the decompressed data stream of the video and/or of the audio of the corresponding channel according to user's demands.

Further, in the above method, in the step of the device end randomly generating, for each channel of audio, a corresponding modified SSRC value to be written into an RTP packet and sending the corresponding modified SSRC value of each channel of audio to the client end:

in a DESCRIBE phase during an RTSP interaction process, the device end randomly generating, for each channel of audio, a corresponding modified ESRC value to be written into the RTP packet, and carrying the corresponding modified SSRC value of each channel of audio in SDP information to send it to the client end.

According to another aspect of the present invention, a system for video surveillance with single channel of video and multiple channels of audio is provided, which comprises:

a client end, which is configured to interact with a device end by a process of RTSP, request single channel of video and multiple channels of audio from the device end and receive RTP packets of the single channel of video and of the multiple channels of audio, distinguish the video from the audio according to PT values in the RTP packets, distinguish individual channels of audio according to modified SSRC values in the RTP packets of the multiple channels of audio, and play the video and/or the audio of a corresponding channel according to user's demands;

the device end, which is configured to interact with the client end by a process of RTSP, randomly generate, for each channel of audio, a corresponding modified SSRC value to be written into an RTP packet and send the corresponding modified SSRC value of each channel of audio to the client end, and capture the single channel of video and the multiple channels of audio, generate an RTP packet of the single channel of video and send the same to the client end, generate an RTP packet of each channel of audio containing an initial SSRC value, modify the initial SSRC value in the RTP packet of each channel of audio to the corresponding modified SSRC value, then send the RTP packet of each channel of audio containing the modified SSRC value to the client end, wherein each RTP packet contains a PT value distinguishing a video from an audio.

Further, in the above system, the device end is configured to encode and compress each channel of audio or video respectively and individually so as to form a data stream, package the data stream to form an RTP packet containing the initial SSRC value; send the RTP packet of the single channel of video to the client end; and modify the initial SSRC value in the RTP packet of each channel of audio to the corresponding modified SSRC value, then send the RTP packet of each channel of audio containing the modified SSRC value to the client end.

Further, in the above system, the client end is configured to unpack the RTP packets, distinguish the video from the audio according to the PT values in the RTP packets, distinguish individual channels of audio according to the modified SSRC values in the RTP packets of the multiple channels of audio, decompress the data stream of each channel of audio or video, and play the decompressed data stream of the video and/or of the audio of a corresponding channel according to user's demands.

Compared to the existing technology, the present invention enables to audio-video capturing of multiple channels of audio and single channel of video, and enables a user to select freely a video and/or audio of a corresponding channel to play by the following: allocating a fixed initial SSRC value for each channel of audio by a device end; establishing an RTSP interaction mode between a client end and the device end; the client end requesting, from the device end, single channel of video and multiple channels of audio, the device randomly generating, for each channel of audio, a corresponding modified SSRC value to be written into an RTP packet, and sending the corresponding modified SSRC value of each channel of audio to the client end; the device end capturing the single channel of video and the multiple channels of audio, generating an RTP packet of the single channel of video and sending the same to the client end, generating an RTP packet of each channel of audio containing the initial SSRC value, and modifying the initial SSRC value in the RTP packet of each channel of audio to the corresponding modified SSRC value, then sending the RTP packet of each channel of audio containing the modified SSRC value to the client end, wherein each RTP packet contains a PT value distinguishing a video from an audio; the client end receiving the RTP packets of the single channel of video and of the multiple channels of audio, distinguishing the video from the audio according to the PT values in the RTP packets, distinguishing individual channels of audio according to the modified SSRC values in the RTP packets of the multiple channels of audio, and playing the video and/or the audio of a corresponding channel according to user's demands.

SPECIFIC EMBODIMENTS

Detailed description of the present invention will be given in combination with the figures and specific embodiments so as to make above objects, features and advantages of the present invention more clear and easy to be understood.

Embodiment One

Figure 1:
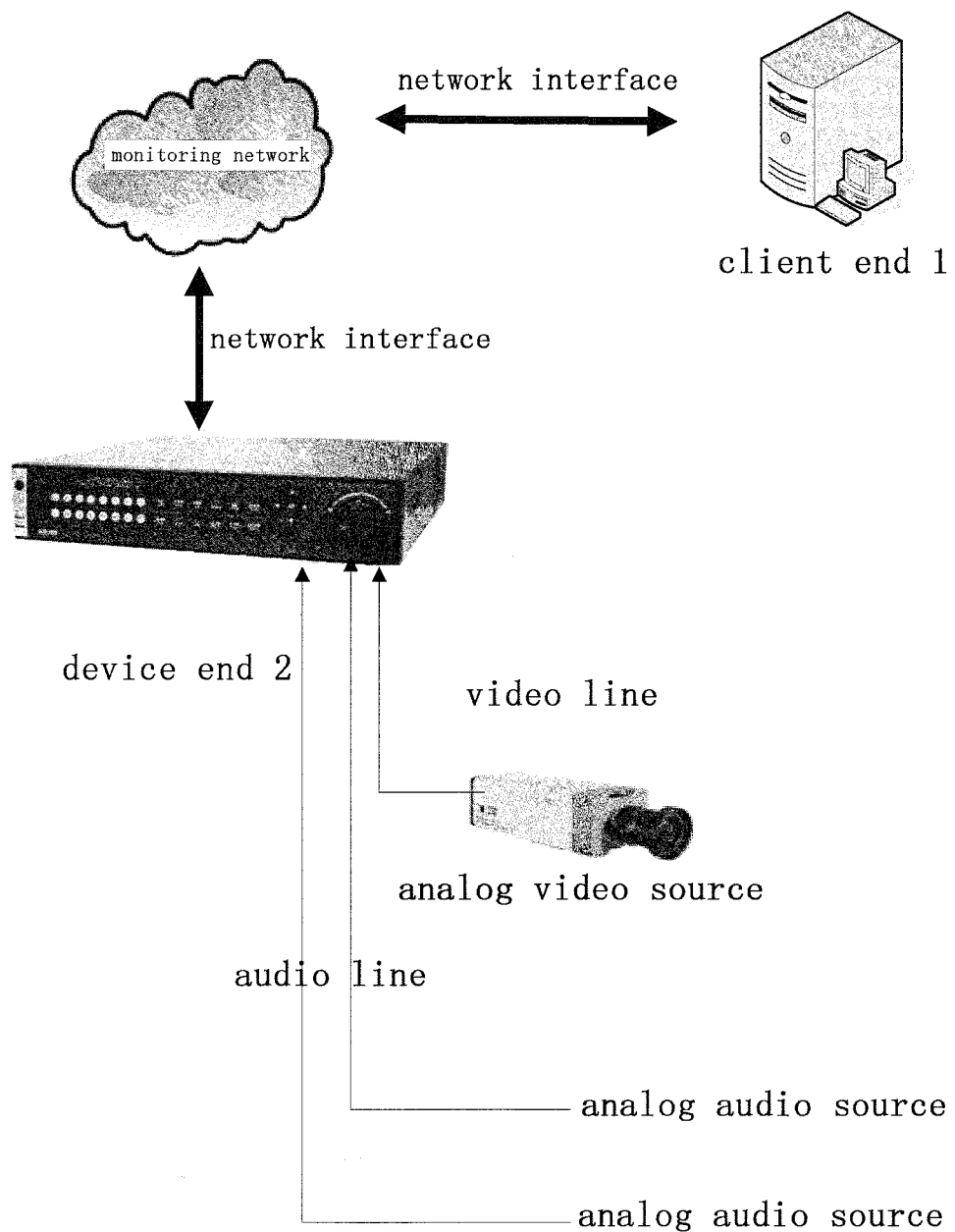
FIG. 1 is a schematic diagram illustrating the interaction between a client end and a device end provided by an embodiment of the present invention.
Figure 2:
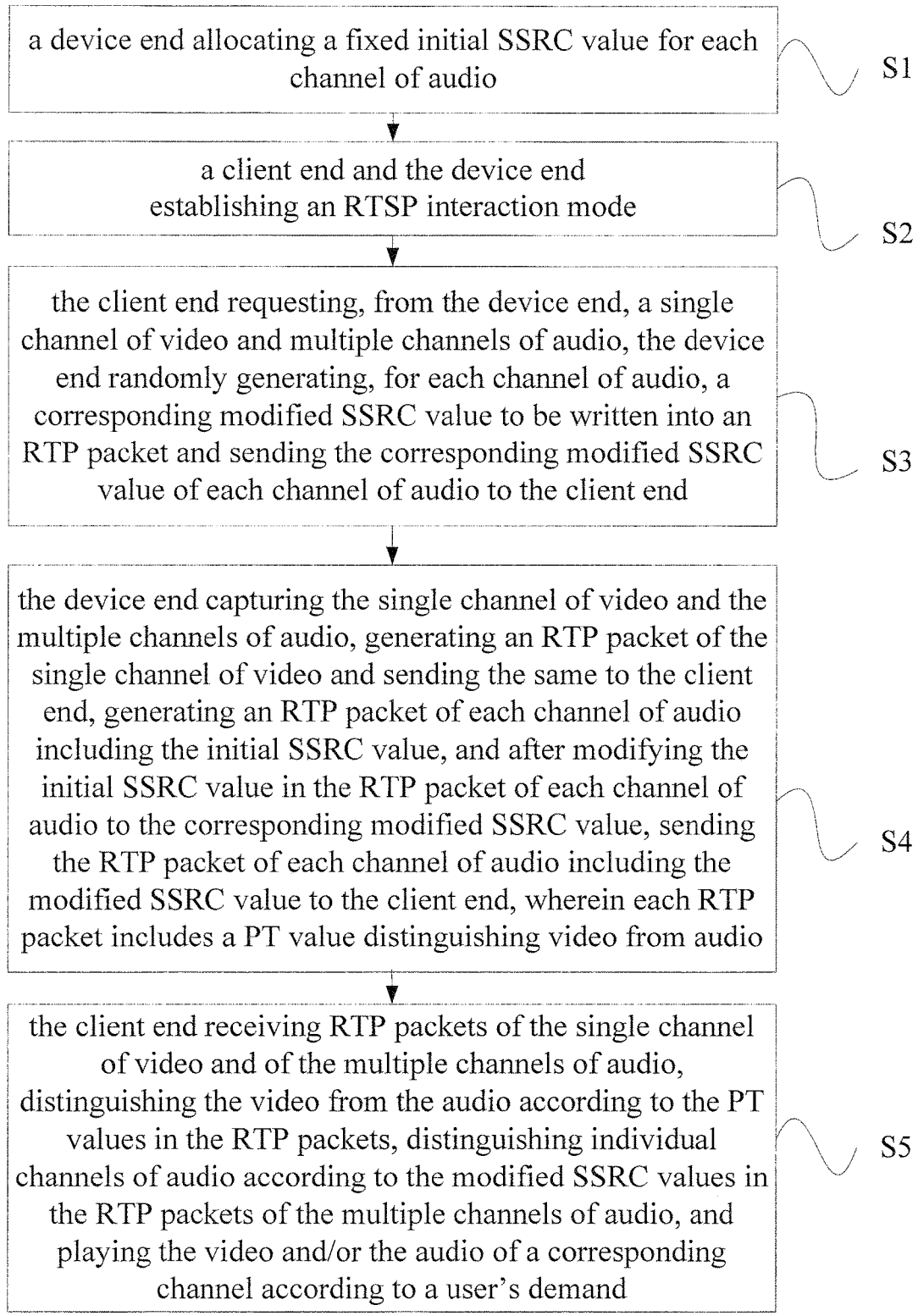
FIG. 2 is a flowchart of a method for video surveillance with single channel of video and multiple channels of audio provided by an embodiment of the present invention.

As shown in FIGS. 1 and 2, the present invention provides a method for video surveillance with single channel of video and multiple channels of audio, which comprises a client end interacting with a device end by RTSP (Real Time Streaming Protocol):

step S1: a device end allocating a fixed initial SSRC value for each channel of audio;

step S2: a client end 1 and a device end 2 establishing an RTSP interaction mode;

step S3: the client end 1 requesting, from the device end 2, a single channel of video and multiple channels of audio, the device end 2 randomly generating, for each channel of audio, a corresponding modified SSRC value to be written into an RTP packet and sending the corresponding modified SSRC value of each channel of audio through SDP information to the client end 1. In this way, the client end 1 can get to know the number of channels of audio and the corresponding modified SSRC value of each channel of audio according to the number and order of the modified SSRC values.

In particular, RTSP is Real Time Streaming Protocol, which is an application layer protocol in TCP/IP Protocol system and is an IETF RFC standard submitted by Columbia University, Netscape and RealNetworks, Inc. RTSP defines how a one-to-many application program transmits multimedia data effectively through an IP network. RTSP is above RTP (Realtime Transport Protocol) and RTCP (Realtime Transport Control Protocol) in terms of systematic architecture, RTSP completes data transportation by using TCP or RTP. Comparing RTSP with HTTP, HTTP transmits HTML while RTSP transmits multimedia data. HTTP request is issued by a client end and responded by a device end; while in case of using RTSP, a client end 1 and a device end 2 both can issue a request, that is the RTSP is bidirectional.

Preferably, in step S2, in a DESCRIBE phase during an RTSP interaction process, the device end 2 randomly generates, for each channel of audio, a corresponding modified SSRC value to be written into an RTP packet, and carries the corresponding modified SSRC value of each channel of audio in SDP information to send it to the client end 1. In particular, RTSP interaction can be divided into the several phases: OPTIONS, SET_PARAMETER, DESCRIBE, SETUP, PLAY, PAUSE, HEARTBEAT, TEARDOWN. In the present embodiment, in order to distinguish multiple channels of audio, a plurality of SSRC values such as SSRC1, SSRC2 . . . SSRCn are randomly generated for multiple channels of audio in the DESCRIBE phase, and these values are carried in SDP information and returned to the client end 1, wherein: the first SSRC1 is the modified SSRC value of the first channel of audio and the n-th SSRCn is the modified SSRC value of the n-th channel of audio sequentially. Then, when subsequently sending an RTP packet to the client end 1, the initial SSRC value in the header of the RTP packet is modified to a corresponding modified SSRC value. For example, the device 2 determines, according to the initial SSRC value of an audio RTP packet when sending data stream, to modify the initial SSRC value of the first channel of audio to the modified SSRC value SSRC1 if the initial SSRC value of the audio is s1, and to modify the initial SSRC value of the n-th channel of audio to the modified SSRC value SSRCn if the initial SSRC value of the audio is "Sn".

Specifically, SDP is Session Description Protocol, the purpose of which is to transmit media stream information in a media session and allow the receiver of the Session Description to participate in the session. SDP is substantially operated over Internet and defines a uniform format of Session Description. However, it neither defines the allocating of multi-cast addresses and the transmission of SDP messages, nor supports media-coding scheme negotiation, and these functions are all completed by an underlying session transport protocol. A typical underlying session transport protocol comprises: SAP (Session Announcement Protocol), SIP, RTSP, HTTP and E-Mail using MIME, wherein: SAP can only contains one Session Description, SDP of other session transport protocols can contain a plurality of Session Descriptions, the uniform format of Session Description comprises:

1) the tile and purpose of a session;
2) the duration of a session;
3) media information contained in a session, comprising: media type (video, audio, etc), transport protocol (RTP/UDP/IP, H.320, etc), media format (H.261 video, MPEG video, etc), multi-cast or remote (unicast) address and port;
4) information needed for receiving media (addresses, ports, formats and so on);
5) information on the bandwidth used;
6) trusted contact information (Contact information).

In step S4, the device end 2 captures the single channel of video and the multiple channels of audio, generates an RTP packet of the single channel of video and sends the same to the client end 1, generates an RTP packet of each channel of audio including the initial SSRC value, and modifying the initial SSRC value in the RTP packet of each channel of audio to the corresponding modified SSRC value, then sends the RTP packet of each channel of audio including the modified SSRC value to the client end 1, wherein each RTP packet includes a PT value distinguishing video from audio. In particular, the device end 2 can capture the single channel of video by an IP camera. IP camera is a new-generation camera generated by the combination of traditional cameras and network technology, which can transmit a video to the other end of the earth through network, and a viewer at the distal end can monitor the video with a standard network browser (such as Microsoft IE or Netscape) or a matching client end software and without any professional software. IP camera is provided with an embedded chip, and utilizes an embedded real-time operating system. A video signal transmitted from an IP camera is received by a device end and compressed by an efficient compression chip after digitalization, and then is transmitted to a client end or a managing server through a network bus. A user of the client end 1 can watch a video surveillance with a browser or client end software. Moreover, an authorized user can also control the action of a pan-tilt camera lens of an IP camera or performs system configuration on the device end and the IP camera. The device end 2 can capture one channel of analog video source and multiple channels of analog audio sources, generate an RTP packet of the single channel of video and send the same to the client end 1, generate an RTP packet of each channel of audio containing an initial SSRC value, and modify the initial SSRC value in the RTP packet of each channel of audio to the corresponding modified SSRC value, then send the RTP packet of each channel of audio containing the modified SSRC value to the client end 1, that is, send the RTP packets of single channel of video and of multiple channels of audio through network to the client end 1.

Preferably, the step S4 can specifically comprise:

the device end 2 encoding and compressing each channel of audio or video respectively and individually so as to form a data stream, packaging the data stream to form an RTP packet containing the initial SSRC value;

sending the RTP packet of the single of video to the client end, and modifying the initial SSRC value in the RTP packet of each channel of audio to the corresponding modified SSRC value, and sending the RTP packet of each channel of audio containing the modified SSRC value to the client end. In particular, in order for the client end 1 to properly and effectively distinguish each channel of audio when receiving multiple channels of audio, it is needed to modify the initial SSRC value in the header of a RTP packet to the modified SSRC value. For example, the SSRC value of the first channel of audio is modified to the modified SSRC value SSRC1, the SSRC value of the second channel of audio is modified to the modified SSRC value SSRC2, and the SSRC value of the n-th channel of audio is modified to the modified SSRC value SSRCn. When the client end 1 receives multiple channels of audio, it is possible to store and play each channel of audio separately according to the modified SSRC values. The device end 2 can comprise a capturing module, an encoding module, a packaging module, a network sending module, which complete respectively various functions, i.e., encoding and compressing single channel of video and multiple channels of audio so as to form a data stream, packaging the data stream to form an RTP packet and sending the RTP packet to the client end. An RTP packet message is constituted by two parts: a header and a payload. The format of a RTP header is as shown in the figure below,

| V | P | X | CC | M | PT | Serial number |
|---|---|---|----|---|----|--------------|
| Time stamp ||||||| 
| Synchronous source (SSRC) identifier ||||||| 
| Contributing source (CSRC) identifiers ||||||| 
| . . . ||||||| wherein:

V: version number of a RTP protocol, which accounts for 2 bits, the version number of the current protocol is 2.

P: a filling flag, which accounts for 1 bit. If P=1, then one or more additional eight-bit groups are filled at the end of this message, which are not a part of a payload.

X: an extension flag, which accounts for 1 bit. If X=1, then the RTP header is followed by one extension header.

CC: a CSRC counter, which accounts for 4 bits, indicating the number of CSRC identifiers.

M: a mark, which accounts for 1 bit, having different meanings for different payloads. It marks the complete of one frame for a video; and marks the start of a session for an audio.

Synchronous source (SSRC) identifier: accounts for 32 bits, for identifying a synchronous source. This identifier is randomly selected, and two different synchronous sources participating in one video conference cannot be provided with the same SSRC value.

Contributing source (CSRC) identifiers: each CSRC identifier accounts for 32 bits, and the number thereof may be 0 to 15. Each CSRC identifies all the contributing sources contained in the payload of this RTP message.

PT: payload type, which accounts for 7 bits, for describing the payload type in an RTP message, such as a GSM audio, and a JPEM picture and the like.

Serial number: accounts for 16 bits, for identifying the serial number of an RTP message sent by a sender. The serial number increases by 1 each time one message is sent. A receiver detects the packet loss through serial numbers, re-orders messages and recovers data.

Time stamp (Timestamp): which accounts for 32 bits, reflects the time when the first 8-bit group of an RTP message is sampled. A receiver calculates delay and delay jitter with time stamps and performs a synchronizing control.

Step S5, the client end 1 receives the RTP packets of the single channel of video and of the multiple channels of audio, distinguishes the video from the audio according to the PT values in the RTP packets, distinguishes individual channels of audio according to the modified SSRC values in the RTP packets of the multiple channels of audio, and plays the video and/or the audio of a corresponding channel according to a user's demand.

Preferably, in step S5, the step of distinguishing the video from the audio according to the PT values in the RTP packets, distinguishing individual channels of audio according to the modified SSRC values in the RTP packets of the multiple channels of audio, and playing the video and/or the audio of a corresponding channel according to user's demands specifically comprises:

unpacking the RTP packets, distinguishing the video from the audio according to the PT values in the RTP packets, and distinguishing individual channels of audio according to the modified SSRC values in the RTP packets of multiple channels of audio, decompressing the data stream of each channel of audio or video, and playing the decompressed data stream of the video and/or of the audio of the corresponding channel according to user's demands. In particular, the client end may comprise a network receiving module, an unpacking module, a decoding module, a playing module, wherein: the network receiving module fulfills the function of receiving RTP packets of single channel of video and of multiple channels of audio, the unpacking module fulfills the functions of unpacking the RTP packets and distinguishing data streams of a video or of individual channels of audio according to the PT values and the modified SSRC values in the RTP header, the decoding module fulfills the function of decompressing data streams, and the playing module plays the decompressed data streams of the video and of the audio of a corresponding channel according to user's demands.

Overall, in this embodiment, a device end captures individually single channel of video and multiple channels of audio, and a client end plays in real time and on-demand any channel thereof when it is needed to preview and playback a video and an audio in real time.

Embodiment Two

Figure 3:
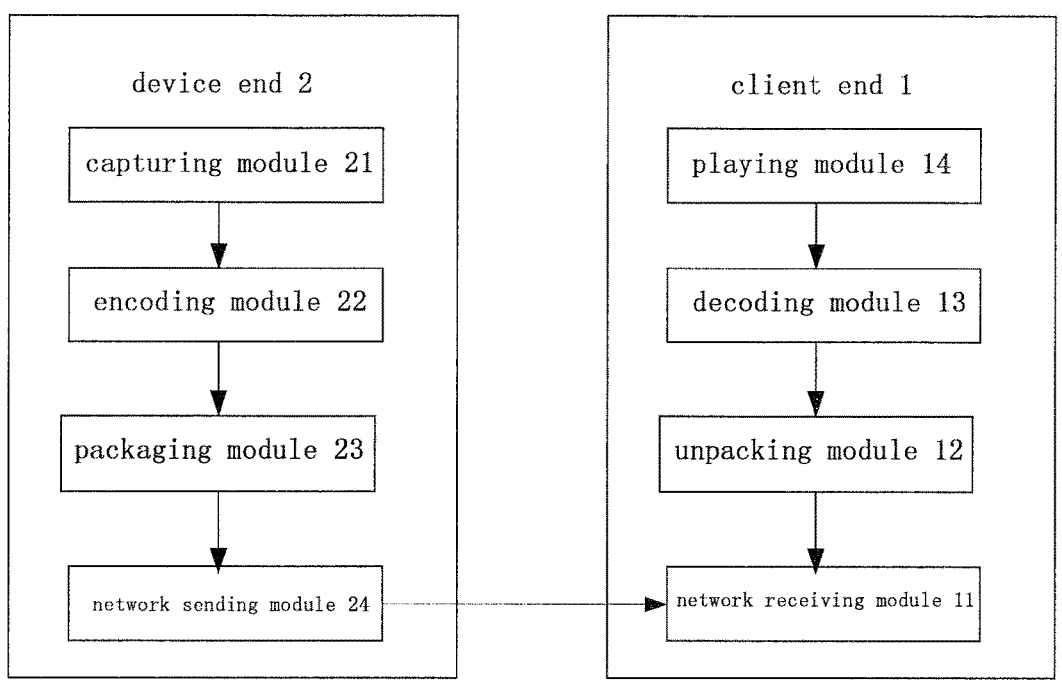
FIG. 3 is a block diagram of a system for video surveillance with single channel of video and multiple channels of audio provided by an embodiment of the present invention.

As shown in FIGS. 1 and 3, the present invention further provides another system for video surveillance with single channel of video and multiple channels of audio, comprising a client end and a device end.

The client end 1, is configured to interact with a device end by a process of RTSP (Real Time Streaming Protocol), request single channel of video and multiple channels of audio from the device end, receive RTP packets of the single channel of video and of the multiple channels of audio, distinguish the video from the audio according to PT values in the RTP packets, distinguish individual channels of audio according to modified SSRC values in the RTP packets of the multiple channels of audio, and play the video and/or the audio of a corresponding channel according to user's demands.

Preferably, the client end 1 is configured to unpack the RTP packets, distinguish data stream of a video or of individual channels of audio according to the modified SSRC values in the RTP headers, decompress the data stream of each channel of audio or video, and play the decompressed data stream of the video and/or of the audio of the corresponding channel according to user's demands. In particular, the client end 1 may comprise a network receiving module 11, an unpacking module 12, a decoding module 13, a playing module 14, wherein: the network receiving module 11 fulfills the function of receiving RTP packets of single channel of video and of multiple channels of audio, the unpacking module 12 fulfills the functions of unpacking the RTP packets and storing data streams of a video or of individual channels of audio according to the initial SSRC values or the modified SSRC values in RTP headers, the decoding module 13 fulfills the function of decompressing data streams, and the playing module 14 plays the decompressed data streams of video or audio of a corresponding channel according to user's demands.

The device end 2 is configured to interact with the client end by a process of RTSP, randomly generate, for each channel of audio, a corresponding modified SSRC value to be written into an RTP packet and send the corresponding modified SSRC value of each channel of audio to the client end 1, as well as capture the single channel of video and the multiple channels of audio, generate an RTP packet of the single channel of video and send the same to the client end 1, generate an RTP packet of each channel of audio containing an initial SSRC value, and modify the initial SSRC value in the RTP packet of each channel of audio to the corresponding modified SSRC value, then send the RTP packet of each channel of audio containing the modified SSRC value to the client end, wherein each RTP packet contains a PT value distinguishing a video from an audio. In particular, after the device end 2 sends the modified SSRC value of a corresponding RTP packet of each channel of audio to the client end 1, the client end 1 can get to know the number of channels of audio according to the number and order of the corresponding modified SSRC values and the corresponding modified SSRC value of each channel of audio.

More preferably, in a DESCRIBE phase during an RTSP interaction process, the device end 2 randomly generates, for each channel of audio, a corresponding modified SSRC value for an RTP packet, and carries the corresponding modified SSRC value of each channel of audio in SDP information to send it to the client end. Preferably, the device end 2 is configured to encode and compress each channel of audio or video respectively and individually so as to form a data stream, package the data stream to form an RTP packet containing the initial SSRC value; send the RTP packet of the single channel of video to the client end; modify the initial SSRC value in the RTP packet of each channel of audio to the corresponding modified SSRC value, and send the RTP packet containing the modified SSRC value of each channel of audio to the client end. In particular, the device end 2 can comprise a capturing module 21, an encoding module 22, a packaging module 23, a network sending module 24, which completes respectively various functions, i.e., encoding and compressing single channel of video and multiple channels of audio to form a data stream, packaging the data stream to form an RTP packet and sending the RTP packet to the client end etc. For the detailed description of the present embodiment, reference can be made to the corresponding part of the first embodiment, which is omitted here.

In view of the above, the present invention can enable the audio-video capturing of multiple channels of audio and single channel of video, and enables a user to select freely a video and/or audio of a corresponding channel to play by the following: allocating a fixed initial SSRC value for each channel of audio by a device end; establishing an RTSP interaction mode between a client end and the device end; the client end requesting, from the device end, single channel of video and multiple channels of audio, the device randomly generating, for each channel of audio, a corresponding modified SSRC value to be written into an RTP packet and sending the corresponding modified SSRC value of each channel of audio to the client end; the device end capturing the single channel of video and the multiple channels of audio, generating an RTP packet of the single channel of video and sending the same to the client end, generating an RTP packet of each channel of audio containing the initial SSRC value, and modifying the initial SSRC value in the RTP packet of each channel of audio to the corresponding modified SSRC value, then sending the RTP packet of each channel of audio containing the modified SSRC value to the client end, wherein each RTP packet contains a PT value distinguishing a video from an audio; the client end receiving the RTP packets of the single channel of video and of the multiple channels of audio, distinguishing the video from the audio according to the PT values in the RTP packets, distinguishing individual channels of audio according to the modified SSRC values in the RTP packets of the multiple channels of audio, and playing the video and/or the audio of a corresponding channel according to user's demands.

Various embodiments in this description are described in a progressive way, and the description for each embodiment focuses on the differences from other embodiments, the identical or similar parts of various embodiments can be referred to each other. For a system disclosed by an embodiment, since it corresponds to the method disclosed by the embodiment, simple description is made to it and the relevant parts can be referred to the description for the method.

A person skilled in the art can further understand that units and algorithm steps of each example described in combination with the embodiments disclosed by the present document can be implemented by electronic hardware, computer software or the combination thereof. In order to clearly illustrate the interchangeability of hardware and software, configurations and steps of various examples have been generally described according to functions in the above description. Whether these functions are implemented by hardware or software depends on the particular applications and design constraints of the technical solutions. A person skilled in the art can fulfill the described functions for each of the particular applications with different methods, and they should not be deemed as going beyond the scope of the present invention.

Obviously, a person skilled in the art can make various alterations and variations to the present invention without departing from the spirit and scope of the present invention. Thus, the present invention is also intended to include the alterations and variations when these alterations and variations fall within the scope of the claims of the present invention and equivalent technology thereof.

The invention claimed is:

1. A method for video surveillance comprising:
    allocating, by a device end, a fixed initial value for each of a plurality of audio channels;
    establishing, by a client end and the device end, an interaction mode;
    requesting, by the client end from the device end, a single video channel and the plurality of audio channels;
    randomly generating, by the device end, for each of the plurality of audio channels, a corresponding modified value to be written into a packet;
    sending the corresponding modified value of each of the plurality of audio channels to the client end;
    capturing, by the device end, the single video channel and the plurality of audio channels;
    generating a packet of the single video channel;
    sending the packet of the single video channel to the client end;
    generating a packet of each of the plurality of audio channels including the initial value;
    modifying the initial value in the packet of each of the plurality of audio channels to the corresponding modified value;
    sending to the client end the packet of each of the plurality of audio channels including the modified value, wherein each packet includes a payload type value distinguishing video from audio;
    receiving, by the client end, the packet of the single video channel and the packets of the plurality of audio channels;
    distinguishing the packet of the single video channel from the packets of each of the plurality of audio channels according to the payload type values in the packets;
    distinguishing individual packets of each of the plurality of audio channels according to the modified values; and
    playing a combination of video and audio according to a user's demand, the combination comprising at least one channel from a set which includes the single video channel and the plurality of audio channels.

2. The method for video surveillance with single channel of video and of claim 1, further comprising:
    encoding and compressing each of the plurality of audio channels and the single video channel respectively and independently so as to form a data stream;
    packaging the data stream to form a packet including the initial value;
    sending the packet of the single video channel to the client end; and
    after modifying the initial value in the packet of each of the plurality of audio channels to the corresponding modified value, sending the packet of each audio channel including the modified value to the client end.

3. The method for video surveillance of claim 2, further comprising:
　　unpacking the packets;
　　decompressing the data stream of video or each channel of audio; and
　　playing the decompressed data stream according to the user's demand, the decompressed data stream comprising at least one channel from a set which includes the single video channel and the plurality of audio channels.

4. The method for video surveillance of claim 1, wherein the randomly generating comprises:
　　randomly generating, by the device end, in a DESCRIBE phase in an interaction mode, for each of a plurality of audio channels, the corresponding modified value to be written into the packet; and
　　carrying the corresponding modified value of each of the plurality of audio channels in session description protocol information to send it to the client end.

5. The method of claim 1, wherein each packet is a Real-time Transfer Protocol packet, the initial value and the modified value are synchronized source identifiers of Real-time Transfer Protocol, and the interaction mode is a Real Time Streaming Protocol process.

6. The method of claim 1, wherein the combination comprises the single video channel and multiple audio channels.

7. A system for video surveillance comprising:
　　a client end, configured to interact with a device end by a process of Real Time Streaming Protocol, request single channel of video and multiple channels of audio from the device end, and receive Real-time Transfer Protocol packets of the single channel of video and of the multiple channels of audio, distinguish the video from the audio according to payload type values in the Real-time Transfer Protocol packets, distinguish individual channels of audio according to modified synchronous source values in the Real-time Transfer Protocol packets of the multiple channels of audio, also play the video and/or the audio of a corresponding channel according to a user's demand; and
　　the device end, configured to interact with the client end by the process of Real Time Streaming Protocol, randomly generate, for each channel of audio, a corresponding modified synchronous source value to be written into an Real-time Transfer Protocol packet, send the corresponding modified synchronous source value of each channel of audio to the client end, and capture the single channel of video and the multiple channels of audio, generate an Real-time Transfer Protocol packet of the single channel of video and send the same to the client end, generate an Real-time Transfer Protocol packet of each channel of audio including an initial synchronous source value, and after modifying the initial synchronous source value in the Real-time Transfer Protocol packet of each channel of audio to the corresponding modified synchronous source value, send the Real-time Transfer Protocol packet of each channel of audio including the modified synchronous source value to the client end, wherein each Real-time Transfer Protocol packet includes a payload type value distinguishing video from audio.

8. The system for video surveillance with single channel of video and multiple channels of audio according to claim 7, characterized in that, the device end is configured to encode and compress each channel of audio or video respectively and independently so as to form a data stream, package the data stream to form an Real-time Transfer Protocol packet including the initial synchronous source value; send the Real-time Transfer Protocol packet of the single channel of video to the client end; after modifying the initial synchronous source value in the Real-time Transfer Protocol packet of each channel of audio to the corresponding modified synchronous source value, send the Real-time Transfer Protocol packet of each channel of audio including the modified synchronous source value to the client end.

9. The system for video surveillance with single channel of video and multiple channels of audio according to claim 8, characterized in that, the client end is configured to unpack the Real-time Transfer Protocol packets, distinguish the video from the audio according to the payload type values in the Real-time Transfer Protocol packets, distinguish individual channels of audio according to the modified synchronous source values in the Real-time Transfer Protocol packets of the multiple channels of audio, decompress the data stream of video or each channel of audio, and play the decompressed data stream of the video and/or of the audio of the corresponding channel according to the user's demand.

\* \* \* \* \*